3,374,233
N-AMINO-17a-AZA-D-HOMOANDROST-5-EN-3β-OL AND HYDRAZONES THEREOF

Robert W. Hamilton, Wilmette, Ill., assignor to G. D. Searle & Co., Chicago, Ill., a corporation of Delaware
No Drawing. Filed Aug. 3, 1964, Ser. No. 387,229
7 Claims. (Cl. 260—240)

This invention relates to N-amino-17a-aza-D-homoandrost-5-en-3β-ol and hydrazones thereof, as also to processes for their preparation. More particularly, this invention provides novel, useful, and unobvious chemical compounds of the formula

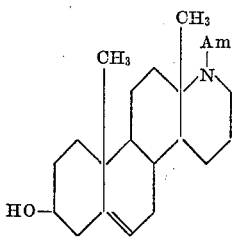

wherein Am represents either the amino radical, —$NH_2$, or a substituted amino radical of the formula

—N=Z in which Z represents an alkylidene or cycloalkylidene radical optionally substituted by an aryl or heterocyclic grouping.

Among the unsubstituted alkylidene and cycloalkylidene radicals represented by Z, especially ethylidene, propylidene, isopropylidene, butylidene, sec-butylidene, cyclopentylidene, cyclohexylidene, and homologous bivalent groupings derived from alkanes and cycloalkanes by removal of 2 hydrogen atoms from the same carbon atom are preferred. Likewise preferred embodiments of Z are substituted alkylidene radicals such as the aralkylidene groupings benzylidene halobenzylidene (o, m, or p), methylenedioxybenzylidene (2,3 or 3,4) napthylmethylene (1 or 2), and dihydronaphthylidene (1 or 2), as also the pyridylmethylene (2, 3, or 4) groupings.

Equivalent to the foregoing compounds for the purposes of this invention are corresponding non-toxic acid addition salts of the formula

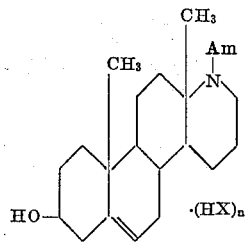

wherein Am has the meaning assigned above; X represents 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage; and $n$ represents a positive integer less than 3.

The compounds to which this invention relates (including the aforesaid acid addition salts) are characterized by valuable pharmacological properties. Thus, for example, they are anti-convulsants, and they also manifest antibiotic activity versus bacteria such as *Diplococcus pneumoniae*, protoza such as *Tetrahymena gelleii*, algae such as *Chlorella vulgaris*, and dicotyledenous seed germination.

Preparation of the compounds hereof proceeds by heating 17a-aza-D-homoandrost-5-en-3β-ol with sodium nitrite in aqueous ethanol under acid conditions to give the N-nitroso compound, which is reduced to N-amino-17a-aza-D-homoandrost-5-en-3β-ol with lithium aluminum hydride in boiling tetrahydrofuran. The amine is converted to the corresponding hydrazones by heating with an appropriate carbonyl compound

O=Z (Z being defined as before), using 2-propanol as solvent and sufficient hydrochloric acid to render the reaction mixture just acid to litmus. The acid addition salts hereof derive from the bases on admixture in 2-propanol solution with 1 or 2 equivalents of any of various inorganic and strong organic acids wherein the anionic components conform to X as hereinabove set forth.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted.

Example 1

(A) *N-nitroso - 17a - aza - D - homoandrost-5-en-3β-ol.*—To a solution of 24 parts of 17a-aza-D-homoandrost-5-en-3β-ol in a mixture of 240 parts of 95% ethanol, 150 parts of water, and just sufficient hydrochloric acid to render the solution acid to litmus is added, during 1 hour with stirring at 70°, a solution of 12 parts of sodium nitrite in 24 parts of water and sufficient hydrochloric acid to maintain the acidity level. Stirring at 70° is continued for 1 hour after the addition is complete, whereupon the reaction mixture is cooled to 0° and then filtered to isolate the crystalline precipitate thrown down. The precipitate is taken up in chloroform; and the chloroform solution is consecutively washed with 5% hydrochloric acid, dried over calcium sulfate, and stripped of solvent by vacuum distillation. The residue, recrystallized from 50% aqueous ethanol, affords N-nitroso - 17a-aza - D - homoandrost - 5-en-3β-ol softening at approximately 182° and melting at 192–194°.

(B) *N-amino - 17a - aza - D - homoandrost - 5-en-3β-ol.*—To a suspension of 20 parts of lithium aluminum hydride in 1500 parts of tetrahydrofuran is added, with vigorous agitation during 15 minutes, a solution of 20 parts of N-nitroso - 17a - aza - D - homoandrost-5-en-3β-ol in 180 parts of tetrahydrofuran. The resultant mixture is heated at the boiling point under reflux with continued agitation for 16 hours, whereupon 21 parts of water, 19 parts of aqueous 20% sodium hydroxide, and 54 parts of water are consecutively mixed in. The mixture thus obtained is heated to the boiling point, whereupon insoluble solids are separated by filtration. The solids are washed with 200 parts of boiling tetrahydrofuran, and the wash liquor is combined with the hot filtrate. From the combined solutions, on cooling, there precipitates N-amino - 17a - aza - D - homoandrost - 5-en-3β-ol which, filtered off and dried in air, melts at 249–253°.

(C) *N-amino - 17a - aza - D - homoandrost - 5-en-3β-ol hydrochloride.*—To a suspension of 24 parts of N- amino - 17a - aza - D - homoandrost - 5-en-3β-ol in 280 parts of absolute ethanol at the boiling point under reflux is added just sufficient 2-propanolic hydrogen chloride to acidity the suspension and bring about solution. The solution is cooled and then diluted with 180 parts of anhydrous ether. The solution thus obtained is chilled to 0°. The precipitate which forms is filtered off and recrystallized from a mixture of ethanol and ether to give N-amino - 17a - aza - D - homoandrost - 5-en-3β-ol hydrochloride melting at approximately 287° (with browning and gas evolution).

(D) *N-ethylideneamino - 17a - aza - D - homoandrost-5-en-3β-ol.*—To a mixture of 50 parts of N-amino-17a-aza - D - homoandrost-5-en-3β-ol and 1600 parts of 2-propanol at the boiling point under reflux is added just sufficient 2-propanolic hydrogen chloride to render the mixture acid to litmus and effect solution. The solution is cooled, whereupon 8 parts of acetaldehyde is introduced and the resultant mixture heated at the boiling point under reflux for 3 hours. Solvent is then stripped by vacuum distillation and the residue partitioned between chloroform and water. The chloroform phase is separated, consecutively washed with water and aqueous 5% potassium carbonate, dried over anhydrous potassium carbonate, and stripped of solvent by vacuum distillation. The resultant residue, recrystallized from aqueous ethanol, affords N-ethylideneamino - 17a - aza - D - homoandrost-5-en-3β-ol sintering at approximately 154° and melting at 159–162°. The product has the formula

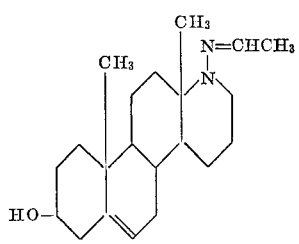

*Example 2*

*N-isopropylideneamino - 17a - aza - D - homoandrost-5-en-3β-ol.*—To a mixture of 50 parts of N-amino-17a-aza-D-homoandrost - 5 - en-3β-ol and 1600 parts of 2-propanol at the boiling point under reflux is added just sufficient 2-propanolic hydrogen chloride to render the mixture acid to litmus and effect solution. The solution is cooled, whereupon 100 parts of acetone is introduced and the resultant mixture heated at the boiling point under reflux for 3 hours. The solvent is then stripped by vacuum distillation and the residue partitioned between chloroform and water. The chloroform phase is separated, consecutively washed with water and aqueous 5% potassium carbonate, dried over anhydrous potassium carbonate, and stripped of solvent by vacuum distillation. The residue is N-isopropylideneamino - 17a-aza-D-homoandrost-5-en-3β-ol, having the formula

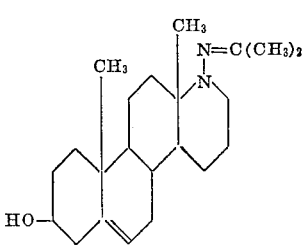

*Example 3*

*N-cyclopentylideneamino - 17a - aza - D-homoandrost-5-en-3β-ol.*—Substitution of 15 parts of cyclopentanone for the acetone called for in Example 2 affords, by the procedure there detailed, N-cyclopentylideneamino - 17a-aza-D-homoandrost-5-en-3β-ol having the formula

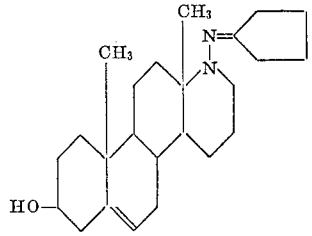

*Example 4*

*N-cyclohexylideneamino - 17a -aza - D - homoandrost-5-en-3β-ol.*—Substitution of 18 parts of cyclohexanone for the acetaldehyde called for in Example 1D affords, by the procedure there detailed, N-cyclohexylideneamino-17a-aza-D-homoandrost-5-en-3β-ol melting at 143–147°. The product has the formula

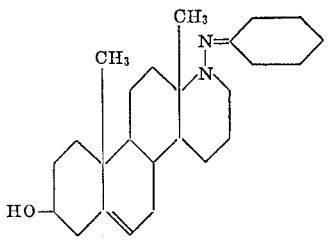

*Example 5*

*N - benzylideneamino - 17a - aza - D - homoandrost-5-en-3β-ol.*—Substitution of 19 parts of benzaldehyde for the acetone called for in Example 2 affords, by the procedure there detailed, N - benzylideneamino-17a-aza-D-homoandrost-5-en-3β-ol, having the formula

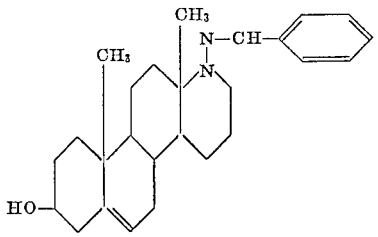

*Example 6*

*N-(o-chlorobenzylideneamino) - 17a - aza - D - homoandrost-5-en-3β-ol.*—Substitution of 25 parts of o-chlorobenzaldehyde for the acetone called for in Example 2 affords, by the procedure there detailed, N-(o-chlorobenzylideneamino) - 17a - aza - D - homoandrost-5-en-3β-ol. The product has the formula

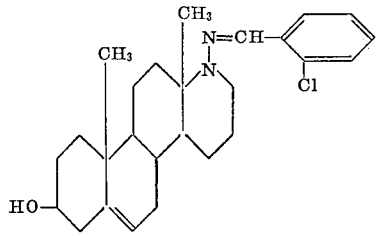

*Example 7*

*N - (p-chlorobenzylideneamino) - 17a - aza - D - homoandrost-5-en-3β-ol.*—Substitution of 25 parts of p-chlorobenzaldehyde for the acetone called for in Example 2 affords, by the procedure there detailed, N-(p-chlorobenzylideneamino) - 17a - aza - D - homoandrost-5-en-3β-ol which, recrystallized from butanone, sinters at approximately 225° and melts at 230–231°. The product has the formula

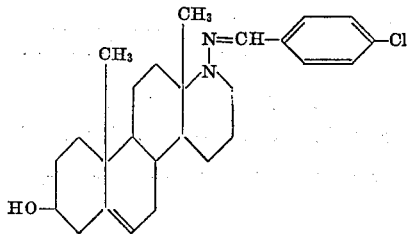

Example 8

N-(34-methylenedioxybenzylideneamino) - 17a - aza-D-homoandrost-5-en-3β-ol.—Substitution of 27 parts of 3,4-methylenedioxybenzaldehyde for the acetaldehyde called for in Example 1D affords, by the procedure there detailed, N - (3,4 - methylenedioxybenzylideneamino)-17a - aza - D - homoandrost-5-en-3β-ol which, heated at 150° under 0.1 mm. pressure for 30 minutes, melts at 183–186°. The product has the formula

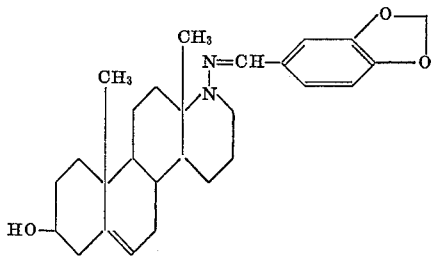

Example 9

N - (Naphthylmethylene) - 17a - aza - D - homoandrost-5-en-3 -ol.—Substitution of 28 parts of 1-naphthaldehyde for the acetaldehyde caled for in Example 1D affords, by the procedure there detailed, N-(naphthylmethylene) - 17a - aza - D - homoandrost - 5 - en - 3β-ol melting at 208–210°. The product has the formula

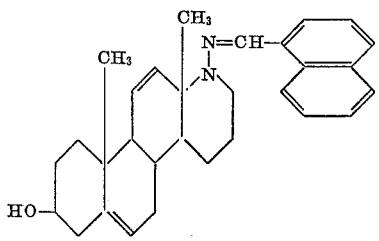

Example 10

N - (3,4-dihydro-2(1H) - naphthylideneamino) - 17a-aza-D-homoandrost-5-en-3β-ol.—Substitution of 21 parts of 2-tetralone for the acetaldehyde called for in Example 1D affords, by the procedure there detailed, N-(3,4-dihydro-2(1H)-naphthylideneamino)-17a - aza - D - homoandrost-5-en-3β-ol. The product has the formula

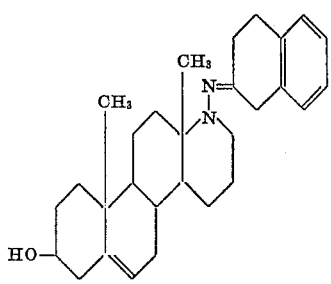

Example 11

N - (2-pyridylmethyleneamino) - 17a - aza - D - homoandrost-5-en-3β-ol.—Substitution of 19 parts of 2-pyridinecarboxaldehyde for the acetaldehyde called for in Example 1D affords, by the procedure there detailed, N - (2 - pyridylmethyleneamino) - 17a - aza - D - homoandrost-5-en-3β-ol which, heated at 110° under 0.1 mm. pressure for 2 hours, sinters at approximately 205° and melts at 216–220°. The product has the formula

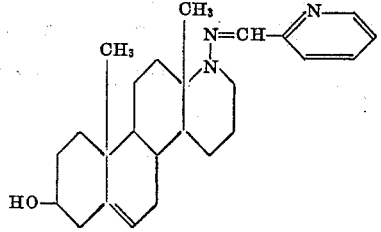

Example 12

N - (3-pyridylmethyleneamino) - 17a - aza - D - homoandrost-5-en-3β-ol.—Substitution of 19 parts of 3-pyridinecarboxaldehyde for the acetaldehyde called for in Example 1D affords, by the procedure there detailed, N-(3-pyridylmethyleneamino) - 17a - aza - D - homoandrost-5-en-3β-ol sintering at approximately 225 and melting at 233–237°. The product has the formula

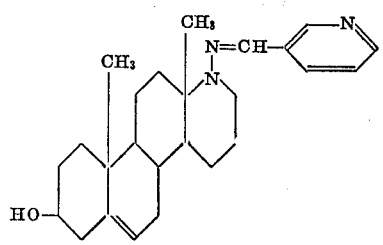

Example 13

N - (4-pyridylmethyleneamino) - 17a - aza - D - homoandrost-5-en-3β-ol.—Substitution of 19 parts of 4-pyridinecarboxaldehyde for the acetaldehyde called for in Example 1D affords, by the procedure there detailed, N-(4-pyridylmethyleneamino) - 17a - aza - D - homoandrost-5-en-3β-ol sintering at approximately 253° and melting at 261–263°. The product has the formula

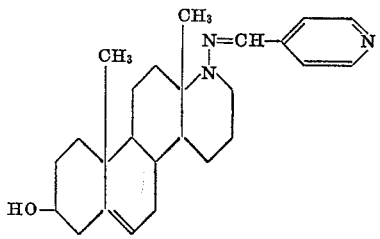

What is claimed is:
1. A compound of the formula

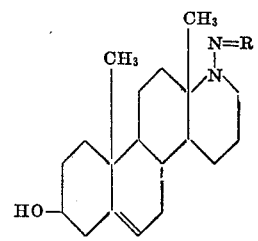

wherein R is selected from the group consisting of the following radicals: ethylidine, isopropylidene, cyclopentylidene, cyclohexylidene, benzylidene, chlorobenzylidene, 3,4-methylenedioxybenzylidene, naphthylmethylene, 3,4 - dihydro-2(1H) - naphthylidene, and pyridylmethylene.

2. N - ethylideneamino - 17a - aza - D - homoandrost-5-en-3β-ol.

3. N-cyclohexylideneamino-17a-aza-D-homoandrost-5-en-3β-ol.
4. N-benzylideneamino - 17a - aza - D - homoandrost-5-en-3β-ol.
5. N-(o-chlorobenzylideneamino) - 17a - aza - D-homoandrost-5-en-3β-ol.
6. N-(4-pyridylmethyleneamino)-17a-aza-D-homoandrost-5-en-3β-ol.
7. N-amino - 17a - aza-D-homoandrost-5-en-3β-ol hydrochloride.

References Cited
UNITED STATES PATENTS
2,738,350  3/1956  Mazur _____ 260—289
3,158,609  11/1964  Hamilton et al. _____ 260—240

OTHER REFERENCES
Shoppee et al., J. Chem. Soc. 1961, pp. 3641–3655.

JOHN D. RANDOLPH, *Primary Examiner.*